(12) United States Patent
Takahashi et al.

(10) Patent No.: US 7,150,917 B2
(45) Date of Patent: Dec. 19, 2006

(54) OPTICAL MEMBER

(75) Inventors: Yukihiro Takahashi, Tokyo (JP); Ken-ichi Shinde, Tokyo (JP)

(73) Assignee: Hoya Corporation, Tokyo (JP)

( * ) Notice: Subject to any disclaimer, the term of this patent is extended or adjusted under 35 U.S.C. 154(b) by 209 days.

(21) Appl. No.: 10/631,758

(22) Filed: Aug. 1, 2003

(65) Prior Publication Data

US 2004/0021966 A1 Feb. 5, 2004

(30) Foreign Application Priority Data

Aug. 2, 2002 (JP) ............................. 2002-226363

(51) Int. Cl.
*B32B 27/00* (2006.01)
*B05D 1/36* (2006.01)
*B05D 5/06* (2006.01)

(52) U.S. Cl. .................. 428/447; 428/448; 427/164; 427/402

(58) Field of Classification Search ..................... None
See application file for complete search history.

(56) References Cited

U.S. PATENT DOCUMENTS

| 4,765,729 | A | 8/1988 | Taniguchi | |
| 6,621,634 | B1 * | 9/2003 | Hanaoka et al. | 359/582 |
| 2003/0003227 | A1 * | 1/2003 | Kono | 427/162 |

FOREIGN PATENT DOCUMENTS

| EP | 1 143 268 | 10/2001 |
| JP | 50-006615 | 1/1975 |
| JP | 58-122979 | 7/1983 |
| JP | 58-172242 | 10/1983 |
| JP | 58-172246 | 10/1983 |
| JP | 60-040254 | 3/1985 |
| JP | 60-221470 | 11/1985 |
| JP | 61-130902 | 6/1986 |
| JP | 62-148902 | 7/1987 |
| JP | 05-215905 | 8/1993 |
| JP | 09-157582 | 6/1997 |
| JP | 09-202648 | 8/1997 |
| JP | 09-127305 | 9/1997 |
| JP | 09-263728 | 10/1997 |
| JP | 11-084103 | 3/1999 |
| JP | 11-092177 | 4/1999 |
| WO | WO 00/10934 | 3/2000 |

OTHER PUBLICATIONS

Co-pending U.S. Appl. No. 10/390,281.
International Search Report dated Nov. 20, 2003.

* cited by examiner

*Primary Examiner*—Michael J. Feely
(74) *Attorney, Agent, or Firm*—Finnegan, Henderson, Farabow, Garrett & Dunner, LLP

(57) ABSTRACT

An optical member and process for making it including an optical substrate, a multilayered antireflection film provided on the optical substrate, and a water-repellent layer provided on an outermost layer of the multilayered antireflection film, wherein the outermost layer of the multilayered antireflection film is a layer containing, as a major component, silicon dioxide; and the water-repellent layer includes a first layer containing, as major components, a fluorine-substituted alkyl group-containing organosilicon compound and a silicon-free perfluoropolyether and a second layer provided on the first layer and which is in direct contact therewith, which contains, as a major component, a silicon-free perfluoropolyether.

13 Claims, 1 Drawing Sheet

OPTICAL MEMBER

CROSS REFERENCE TO RELATED APPLICATION

The present application claims priority under 35 U.S.C. § 119 of Japanese Application No. 2002-226363, filed Aug. 2, 2002, the disclosure of which is expressly incorporated by reference herein.

DESCRIPTION

1. Field of the Invention

The present invention relates to an optical member having a water-repellent thin film having excellent durability and to a process of producing an optical member.

2. Background of the Invention

Antireflection films provided on optical members such as lenses are generally formed from an inorganic oxide such as $ZrO_2$ and $SiO_2$. For this reason, stains by perspiration or fingerprints are liable to adhere thereto, and it is difficult to remove these stains. In order to solve such a problem, it is well known to provide a water-repellent film on the antireflection film.

In recent years, such a water-repellent film is required to have a performance such that the decrease of the water repellency over the course of time is minimized. As a method of obtaining this performance, JP-A-5-215905 discloses a method in which an organosilicon compound is subjected to vapor deposition upon heating in vacuo to form a water-repellent film on an antireflection film.

In the case Where an optical member having a water-repellent layer provided on an antireflection film is stained, the stains on the water-repellent film are removed by a cloth, etc. When the stains are removed by a cloth, etc., there may be an impression that the cloth is caught due to a high coefficient of friction on the water-repellent film. For this reason, there is a risk that wiping with the cloth is carried out too strongly, possibly resulting in the formation of a scratch on the lens.

SUMMARY OF THE INVENTION

The invention provides an optical member in which it is possible to smoothly wipe the top of the water-repellent film, e.g. to remove stains on a water-repellent film with a cloth, etc. The present invention also provides a method for preparing an optical member that exhibits the desired advantageous effects.

DESCRIPTION OF THE EMBODIMENTS

Figure 1:
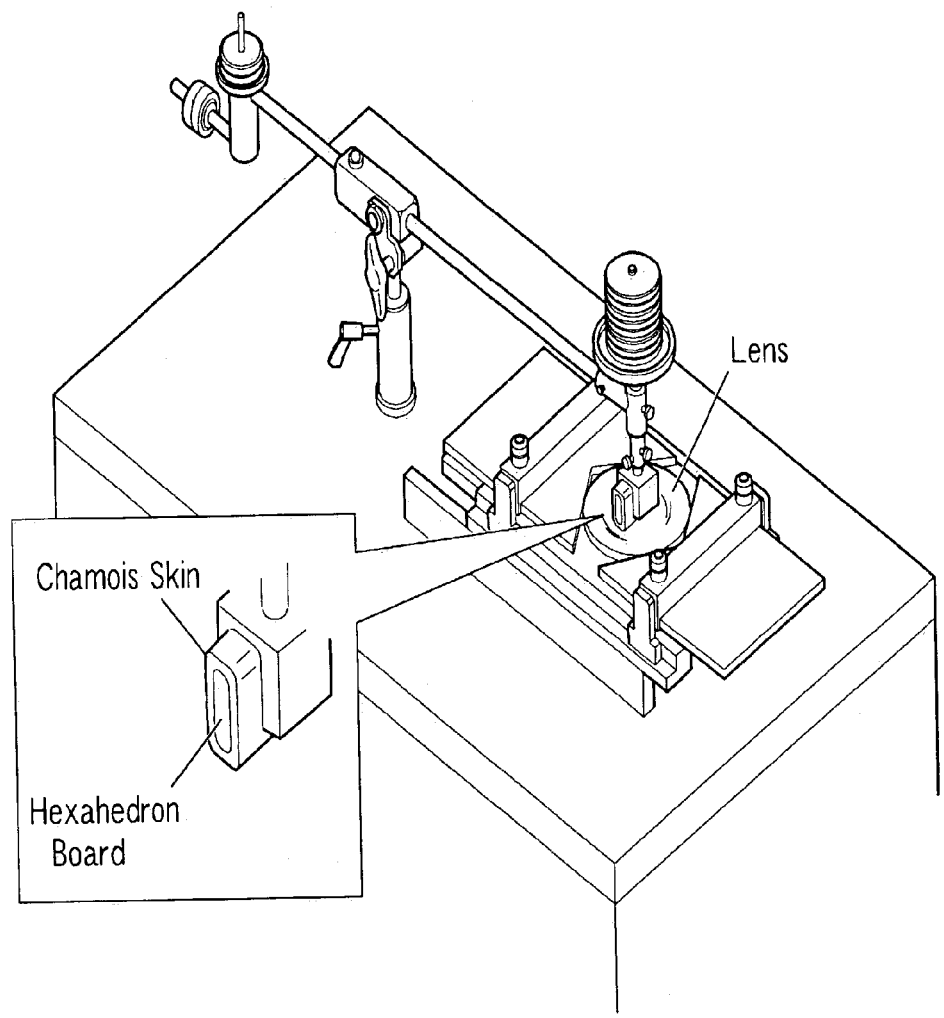
FIG. 1 shows a schematic drawing of the device that can be used for measuring the long term durability characteristics of an optical member.

A feature of the invention is a double-layered water-repellent film comprising a specified composition provided on an outermost layer of an antireflection film. The first layer is a layer provided on the outermost layer of the antireflection film, which comprises a raw material containing, as major components, a fluorine-substituted alkyl group-containing organosilicon compound and a silicon-free perfluoropolyether. The second layer is a layer provided on the first layer while bringing into contact therewith, comprising a raw material containing, as a major component, a silicon-free perfluoropolyether. The expression 'major component' indicates a content of at least 50% by weight of the respective compound(s) in the respective layer, for example, a content of at least 70% by weight. For the first layer of the water-repellent film, this means that the combination of the fluorine-substituted alkyl group-containing organosilicon compound and silicon-free perfluoropolyether is at least 50% by weight of the first layer.

Hitherto, a layer made of silicon dioxide was generally used as the outermost layer of the antireflection film. In contrast, a layer made of a fluorine-substituted alkyl group-containing organosilicon compound as a raw material has good adhesion to the layer made of silicon dioxide as generally used as the outermost layer of the antireflection film and has good water repellency and scratch resistance. Further, a layer made of a silicon-free perfluoropolyether as a major component has an extremely good water-repellent effect and slipperiness in the case where the layer is rubbed with a cloth. However, this layer is insufficient in adhesion to the silicon dioxide layer as generally used as the outermost layer of the antireflection film, so that when the layer is wiped with a cloth, there is a possibility that the layer made of a silicon-free perfluoropolyether as a major component readily peels apart.

It has been found that when the water-repellent film is made of a double-layered structure, and the first layer to be brought into contact with the outermost layer of the antireflection film is made of a layer containing, as major components, a fluorine-substituted alkyl group-containing organosilicon compound and a silicon-free perfluoropolyether, the water repellency and the adhesion to the antireflection film can be improved, and the adhesion between the first layer and the second layer of the water-repellent film can be improved by the silicon-free perfluoropolyether contained in the first layer and the silicon-free perfluoropolyether constituting the second layer.

The foregoing fluorine-substituted alkyl group-containing organosilicon compound is not particularly limited, but examples include compounds represented by the following general formula (I):

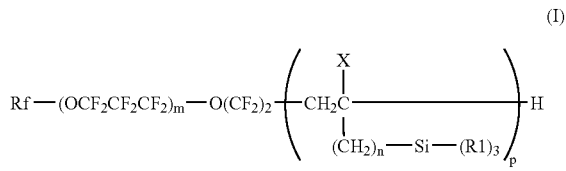

wherein Rf represents a linear perfluoroalkyl group having from 1 to 16 carbon atoms; X represents hydrogen or a lower alkyl group having from 1 to 5 carbon atoms; R1 represents a hydrolyzable group; m represents, an integer of from 1 to 50; n represents an integer of from 0 to 2; and p represents an integer of from 1 to 10.

As the hydrolyzable group represented by R1 described above, examples include an amino group, an alkoxy group which may contain 1 to 2 carbon atoms in its alkyl moiety and a chlorine atom.

Also, as the fluorine-substituted alkyl group-containing organosilicon compound, a compound represented by the following unit formula (11) may be used:

wherein q represents an integer of 1 or more.

Specific examples include n-CF$_3$CH$_2$CH$_2$Si(NH$_2$)$_3$; n-trifluoro(1,1,2,2-tetrahydro)propylsilazane, n-C$_3$F$_7$CH$_2$CH$_2$Si(NH$_2$)$_3$; n-heptafluoro(1,1,2,2-tetrahydro)pentylsilazane, n-C$_4$H$_9$CH$_2$CH$_2$Si(NH$_2$)$_3$; n-nonafluoro(1,1,2,2-tetrahydro)-hexylsilazane, n-C$_6$F$_{13}$CH$_2$CH$_2$Si(NH$_2$)$_3$; n-tridecafluoro(1,1,2,2-tetrahydro)-octylsilazane, and n-C$_8$F$_{17}$CH$_2$CH$_2$Si(NH$_2$)$_3$; n-heptadecafluoro(1,1,2,2-tetrahydro)decylsilazane.

In addition, the fluorine-containing organosilicons disclosed in JP-A-58-167448, JP-A-60-221470 and JP-A-61-10043 can be used as the fluorine-substituted alkyl group-containing organosilicon compound according to the present invention.

Incidentally, examples of commercially available fluorine-substituted alkyl group-containing organosilicon compounds include KP-801 (a trade name product manufactured by Shin-Etsu Chemical Co., Ltd.), OPTOOL DSX (manufactured by Daikin Industries, Ltd.), and a fluorine-based coating agent X-71-130 (a trade name product of Shin-Etsu Chemical Co., Ltd.).

As the silicon-free perfluoropolyether, ones comprising a silicon-free unit represented by the following structural formula (III) may be used:

$$—(RO)— \quad \text{(III)}$$

wherein R represents a perfluoroalkylene group having from 1 to 3 carbon atoms. This perfluoropolyether may have a weight-average molecular weight of from 1,000 to 10,000 g/mol., and optionally from 2,000 to 10,000 g/mol. R represents a perfluoroalkylene group having from 1 to 3 carbon atoms, and specific examples include CF$_2$, CF$_2$CF$_2$, CF$_2$CF$_2$CF$_2$, and CF(CF$_3$)CF$_2$. These perfluoropolyethers (hereinafter referred to as "PFPE") are liquid at a normal temperature and are generally called a fluorocarbon oil.

Examples of PFPE that can be used in the invention include trade name products of the DEMNUM Series manufactured by Daikin Industries, Ltd., trade name products of the BARRIERTA Series manufactured by NOK Kluber Co., Ltd., trade name products of the FOMBLIN Series manufactured by Asahi Glass Co., Ltd., trade name products of the KRYTQX Series manufactured by E.I. du Pont de Nemous & Company, and a trade name product MOLYKOTE HK-30 oil manufactured by Dow Corning Corp.

The foregoing two components of the fluorine-substituted alkyl group-containing organosilicon compound and the silicon-free perfluoropolyether are mixed, and the raw material containing them as major components is used to provide the first layer of the water-repellent layer. A mixing ratio of the silicon-free perfluoropolyether to the fluorine-substituted alkyl group-containing organosilicon compound may be in the range of from 0.01:1 to 100:1 on a weight basis.

Incidentally, the mixture of the fluorine-substituted alkyl group-containing organosilicon compound and the silicon-free perfluoropolyether is commercially available under the trade name OPTOOL DSX manufactured by Daikin Industries, Ltd.

A film thickness of the thin film for forming the fluorine-containing water-repellent layer varies depending upon the amounts of the fluorine-substituted alkyl group-containing organosilicon compound and the'silicon-free perfluoropolyether. Accordingly, when the thickness of the thin film is controlled in an angstrom order, a solution of the fluorine-substituted alkyl group-containing organosilicon compound and the silicon-free perfluoropolyether diluted with a solvent may be used. Examples of fluorine-based solvents are m-xylene hexafluoride, perfluorohexane, and hydrofluoroether.

Further, the concentration of the fluorine-substituted alkyl group-containing organosilicon compound in the solution is not particularly limited so far as the desired object is attained, but it can be properly determined while taking into consideration the kind of the fluorine-substituted alkyl group-containing organosilicon compound and the desired film thickness of the thin film. The formation method of the first layer of the water-repellent film is not particularly limited, but the water-repellent layer is formed by, for example, vapor deposition upon heating or dip coating.

The case where the first layer is formed by vapor deposition upon heating will be described below.

A solution containing the fluorine-substituted alkyl group-containing organosilicon compound and the silicon-free perfluoropolyether may be charged in a vessel and heated as it stands. However, from the standpoint of obtaining many uniform vapor deposited films, it is desirable to impregnate the solution into a porous material. Sintered filters prepared by sintering a powdered metal having high heat conductivity, such as copper and stainless steel may be used as the porous material. Further, from the standpoint of obtaining a proper vapor deposition rate, the porous material suitably has a mesh size of from 40 to 200 μm, and optionally from 80 to 120 μm.

In the case where the fluorine-substituted alkyl group-containing organosilicon compound and the silicon-free perfluoropolyether are vapor deposited on a substrate by vapor deposition upon heating, it is preferred that the vapor deposition is carried out upon heating in vacuo. The degree of vacuum within the vacuum vapor deposition unit is not particularly limited. However, from the standpoint of obtaining a uniform water-repellent film, it may be 8.0×10$^{-1}$ Pa to 1.0×10$^{-6}$ Pa, and optionally from 5.0×10$^{-1}$ Pa to 6.0×10$^{-4}$ Pa The temperature during heating the fluorine-substituted alkyl group-containing organosilicon compound and the silicon-free perfluoropolyether varies depending upon the kind of organosilicon compound and the vacuum condition for vapor deposition. But, the heating temperature is generally in the range of the vapor deposition initiation temperature of the organosilicon compound or higher but not exceeding the decomposition temperature of the organosilicon compound in the desired degree of vacuum.

With respect to the vapor deposition rate, under the condition for keeping the heating temperature within the foregoing range, the time from the initiation of vapor deposition of the organosilicon compound to the completion of heating may be within 90 seconds. Shorter heating times such as within 50 seconds, within 40 seconds, within 30 seconds, within 20 seconds, and within 10 seconds are possible. The heating time also may be carried out within 5 seconds. By completing the vapor deposition within the above-specified temperature range and for a short period of time, i.e., giving a high energy to the organosilicon compound for a short period of time, it is possible to provide an optical member having a water-repellent film having excellent durability.

Further, even when a water-repellent agent composed of two components having a different vapor deposition initiation temperature, as in the first layer of the water-repellent film in the invention, is used, it is possible to undergo the vapor deposition substantially simultaneously and to obtain a uniform film by giving a high energy not exceeding the decomposition temperature of the water-repellent agent to undergo vapor deposition.

An example of a method of attaining the above-specified vapor deposition rate is a method in which electron beams are irradiated to the organosilicon compound. To emit electron beams, an electron gun, that is conventionally employed in a vapor deposition unit, can be used. By using the electron gun, it is possible to irradiate a uniform energy to the whole of the organosilicon compound, whereby it becomes easy to provide a uniform water-repellent film.

The power of the electron gun varies depending upon the substances to be used, the vapor deposition unit, the degree of vacuum, and the irradiation area. The accelerating voltage may be approximately 6 kV, and the application current is from about 5 to 80 mA. When the optical member is produced by this method, the water-repellent layer having excellent durability can be obtained.

Next, the invention is described with respect to the second layer of the water-repellent layer. This second layer contains, as a major component, a silicon-free perfluoropolyether. It is in direct contact with the first layer. As the PFPE to be used for forming the second layer, it is possible to use the same as those used for the first layer. The PFPEs used for the first layer and for the second layer may be the same or be different from each other. However, taking into consideration the adhesion between the first layer and the second layer and easiness of the production, the PFPE used for the first layer and the PFPE used for the second layer can be the same.

The method for forming the second layer is not particularly limited, and the same method as in the formation of the first layer can be used. Also, PFPE may be coated at room temperature. Even when PFPE is applied at room temperature as it stands to form the second layer, since the adhesion to the silicon-free perfluoropolyether contained in the first layer is good, and the slipperiness as a characteristic of the layer made of a silicon-free perfluoropolyether is good, it is possible to obtain an optical member exhibiting a durable water-repellent performance.

Examples of the optical substrate that is used in the invention include plastic-made optical substrates such as substrates formed from methyl methacrylate homopolymers, copolymers made of monomer components comprising methyl methacrylate and at least one other monomer, such as a monomer having a vinyl group, diethylene glycol bisallyl carbonate homopolymers, copolymers made of monomer components comprising diethylene glycol bisallyl carbonate and at least one other monomer, such as a monomer having a vinyl group, sulfur-containing copolymers, halogen-containing copolymers, polycarbonates, polystyrenes, polyvinyl chlorides, unsaturated polyesters, polyethylene terephthalates, and polyurethanes, and inorganic glass-made optical substrates. Incidentally, the substrate may be a substrate having a hardcoat layer provided thereon. As the hardcoat layer cured films containing an organosilicon compound, an acrylic compound, or the like, can be used.

Further, the antireflection film (vapor deposited film) as referred to herein means a single or multilayered film (with the proviso that an $SiO_2$ film be provided as the outermost layer), formed from, for example, $ZrO_2$, $SiO_2$, $TiO_2$, $Ta_2O_5$, $Y_2O_3$, $MgF_2$, or $Al_2O_3$, or a colored film of, for example, $CrO_2$ (with the proviso that an $SiO_2$ film be provided as the outermost layer), which is provided for the purpose of reducing the reflection of the surface of an optical substrate of, for example, a lens. As noted above, a layer containing silicon dioxide as the major component may be used as the outermost layer of the antireflection film.

EXAMPLES

The invention will be specifically described below with reference to the following Examples, but it should not be construed that the scope of the invention as defined by the appended claims is limited thereto.

1. Preparation of antireflection film-provided plastic lens:

Using a diethylene glycol bisallyl carbonate polymer-based lens (HI-LUX, a trade name, manufactured by Hoya Corporation, refractive index: 1.499, diopter: 0.00) as an optical substrate, a cured film as disclosed in JP-A-63-10640 was provided on the plastic lens substrate. Specifically, 2.0 parts by weight of 0.5N hydrochloric acid and 20 parts by weight of acetic acid were added to 240 parts by weight of colloidal silica having an $SiO_2$ concentration of 40% by weight (SNOWTEX 40, a water dispersion of silica manufactured by Nissan Chemical Industries, Ltd.) to prepare a solution, to which was then added dropwise 95 parts by weight of γ-glycidoxypropyl trimethoxysilane (trifunctional organosilicon compound) with stirring at 35° C. The mixture was stirred at room temperature for 8 hours and then allowed to stand at room temperature for 16 hours. To this hydrolysis solution were added 80 parts by weight of methyl cellosolve, 120 parts by weight of isopropyl alcohol, 40 parts by weight of butyl alcohol, 16 parts by weight of aluminum acetylacetone, 0.2 parts by weight of a silicone-based surfactant (trade name: "NUC SILWET Y-7006" produced by Nippon Unica Company), and 0.1 parts by weight of a UV absorber (trade name: "Tinuvin P" available from Ciba-Geigy). The mixture was stirred for 8 hours and then aged at room temperature for 24 hours to obtain a coating composition. The composition was coated at a lifting rate of 15 cm/min by the dipping method, allowed to stand at room temperature for 15 minutes, and then cured upon heating at 120° C. for 2 hours to provide a cured film.

Next, an undercoat layer [refractive index: 1.46, optical film thickness: 0.5 λ (the wavelength as designed for λ was defined as 550 nm)] comprising silicon dioxide was formed on the cured film by the vacuum vapor deposition method (degree of vacuum: $2.67 \times 10^{-3}$ Pa ($2 \times 10^{-5}$ Torr)). On the undercoat layer was formed a first layer [refractive index: 1.70, optical film thickness: 0.24 λ] that is a three-layer equivalent film comprising a layer (optical film thickness: 0.06 λ) made of titanium dioxide obtained by the ion beam assisted deposition method including irradiating with an oxygen ion beam, a layer (optical film thickness: 0.12 λ) made of silicon dioxide obtained by the vacuum vapor deposition method, and a layer (optical film thickness: 0.06 λ) made of titanium dioxide obtained by the ion beam assisted deposition method. On the first layer was formed a second layer (refractive index: 2.40, optical film thickness: 0.5 λ) made of titanium dioxide obtained by the ion beam assisted deposition method, and on the second layer was formed a third layer (refractive index: 1.46, optical film thickness: 0.25 λ) made of silicon dioxide obtained by the vacuum vapor deposition method (degree of vacuum: $2.67 \times 10^{-3}$ Pa ($2 \times 10^{-5}$ Torr)). There was thus obtained an antireflection film-provided plastic lens. This lens had a luminous reflectance of 0.4%.

2. Water-repellent agents as used:

(1) Water-repellent processing agent 1 used for the first layer:

OPTOOL DSX (a trade name, manufactured by Daikin Industries, Ltd.; a mixture containing a fluorine-substituted alkyl group-containing organosilicon compound and a silicon-free perfluoropolyether as major components) was used.

(2) Water-repellent processing agent 2 used for the second layer:

Four kinds of DEMNUM Series silicon-free perfluoropolyethers (S-20, S-65, S-100 and S-200) (trade names, manufactured by Daikin Industries, Ltd.) were used.

3. Evaluation of physical properties:

The plastic lenses obtained in the Examples were evaluated for physical properties according to the following evaluation methods.

(1) Stationary contact angle to water:

Using a contact angle meter (CA-D Model, manufactured by Kyowa Interface Science Co., Ltd.), a drop of water having a diameter of 2 mm was prepared at the tip of a needle at 25° C. and brought into contact with an uppermost portion of the convex surface of the lens to prepare a droplet. At this time, an angle between the droplet and the surface as generated was measured as the stationary contact angle by determining the radius r of the base of the droplet (i.e. the radius of the surface of the lens that is in contact with the droplet) and the height h of the droplet, and by calculating the contact angle θ according to the following equation:

$$\theta = 2 \times \tan^{-1}(h/r)$$

wherein the measurement is carried out within 10 seconds after placing the droplet on the lens in order to minimise errors caused by evaporation of the water.

(2) Appearance:

It was visually examined whether or not mottle of the interference color and change of the interference color appeared, thereby evaluating whether or not the plastic lens had an appearance useful as a spectacle lens.

(3) Durability:

A chamois skin was dipped in water at 25° C., for 5 minutes and then taken out into air. After one minute of keeping the chamois skin under air (25° C., 50 to 60% humidity), this chamois skin was used to rub the surface of the plastic lens having a water-repellent film 5,000 times and 10,000 times in a forward and backward movement while applying a load of 500 g (in air of 25° C., 50 to 60% humidity), and a stationary contact angle of the resulting lens to water was measured in the same manner as described in (1) above. 65 minutes were spent during rubbing 5,000 times and 130 minutes were spent during rubbing 10,000 times. The chamois skin was grade B as defined in KK-C-300C according to the Federal Specifications and Standards of U.S.A. as published by the U.S. Government Printing Office, document Nos. 1963-653355/340, 1969 0-395-523 (4077) and 1972 0-482-195 (3363), and the chamois skin, which was produced by Kubota-Shikawaga Corp. was used. FIG. 1 shows a drawing of an apparatus which was used in the durability test.

(4) Luminous reflectance (one surface):

A luminous reflectance before and after the formation of the water-repellent film was measured by using an autographic spectrophotometer, U-3410 Model manufactured by Hitachi, Ltd.

(5) Slipperiness:

The coefficient of friction and the frictional force (gf) before the initiation and after the completion were measured using a continuous weighing type surface property tester, TYPE: 22H, manufactured by Shinto Scientific Co., Ltd. The measurement was carried out before the durability test as described in (3) above, after the durability test of 5,000 times, and after the durability test of 10,000 times, respectively.

Example 1

A stainless steel-made sintered filter (mesh size: from 80 to 100 microns, diameter 18 mm thickness 3 mm) having 0.15 mL of the water-repellent processing agent 1 (OPTOOL DSX, a trade name, manufacture by Daikin Industries, Ltd.) immersed therein was set within a vacuum vapor deposition unit, and the whole of the sintered filter was heated by using an electron gun under the following condition, to form a first layer of a water-repellent film on the antireflection film-provided plastic lens as cut into the foregoing lens frame shape.

(1) Degree of vacuum: from $3.1 \times 10^{-4}$ Pa to $8 \times 10^{-4}$ Pa ($2.3 \times 10^{-6}$ to $6.0 \times 10^{-6}$ Torr)

(2) Condition of Electron Gun:

Accelerating voltage: 6 kV, application current: 40 mA, irradiation area: $3.5 \times 3.5$ cm$^2$, vapor deposition time: 10 seconds Incidentally, the vapor deposition time means a time from the initiation of heating to the completion of vapor deposition.

Thereafter, "DEMNUM S-20" (manufactured by Daikin Industries, Ltd.) as a silicon-free perfluoropolyether, a suitable amount of which had been immersed on paper, was applied on the first layer of the water-repellent film. The evaluation results are shown in Table 1. The slipperiness and durability were good, and the water repellency was good.

Examples 2 to 4

Water-repellent films were formed in the same manner as in Example 1, except that the water-repellent agent as used in Example 1 was replaced by each of the water-repellent agents shown in Table 1. The evaluation results are shown in Table 1. Similar to Example 1, the water repellency slipperiness and durability were good.

REFERENCE EXAMPLE

The same procedures as in Example 1 were followed, except that the second layer of the water-repellent film was not provided. The results are shown in Table 1. The slipperiness was inferior as compared with that in Examples 1 to 4.

TABLE 1

|  |  | Example 1 | Example 2 | Example 3 | Example 4 | Reference Example |
|---|---|---|---|---|---|---|
| Water-repellent agent | First layer | A | A | A | A | A |
|  | Second Layer | a | b | c | d | — |
| Appearance |  | Good | Good | Good | Good | Good |
| Durability | 0 time | 114 | 113 | 112 | 113 | 113 |
|  | 5,000 times | 108 | 107.5 | 109 | 108 | 107.5 |
|  | 10,000 times | 106 | 105 | 106 | 106 | 105 |

TABLE 1-continued

| | | | Example 1 | Example 2 | Example 3 | Example 4 | Reference Example |
|---|---|---|---|---|---|---|---|
| Luminous reflectance | Before the formation of water-repellent film | | 0.4 | 0.4 | 0.4 | 0.4 | 0.4 |
| | After the formation of water-repellent film | | 0.4 | 0.4 | 0.4 | 0.4 | 0.4 |
| Slipperiness (coefficient of friction) | 0 time | At initiation | 0.1501 | 0.1573 | 0.1566 | 0.1506 | 0.1901 |
| | | At completion | 0.1600 | 0.1599 | 0.1629 | 0.1540 | 0.2701 |
| | 5,000 times | At initiation | 0.1699 | 0.1659 | 0.1627 | 0.1535 | 0.1901 |
| | | At completion | 0.1703 | 0.1673 | 0.1659 | 0.1543 | 0.2800 |
| | 10,000 times | At initiation | 0.1727 | 0.1735 | 0.1655 | 0.1659 | 0.1901 |
| | | At completion | 0.1731 | 0.1746 | 0.1688 | 0.1690 | 0.2901 |
| Slipperiness (frictional force) | 0 time | At initiation | 11.78 | 12.35 | 12.29 | 11.82 | 14.92 |
| | | At completion | 12.56 | 12.55 | 12.79 | 12.09 | 21.20 |
| | 5,000 times | At initiation | 13.34 | 13.02 | 12.77 | 12.05 | 14.92 |
| | | At completion | 13.37 | 13.13 | 13.02 | 12.11 | 21.98 |
| | 10,000 times | At initiation | 13.56 | 13.62 | 12.99 | 13.02 | 14.92 |
| | | At completion | 13.59 | 13.71 | 13.25 | 13.27 | 22.77 |

Note:
A: OPTOOL DSX (a trade name (manufactured by Daikin Industries, Ltd.))
a: DEMNUM S-20 (manufactured by Daikin Industries, Ltd.) (weight average molecular weight: 2,700 g/mol.)
b: DEMNUM S-65 (manufactured by Daikin Industries, Ltd.) (weight average molecular weight: 4,500 g/mol.)
c: DEMNUM S-100 (manufactured by Daikin Industries, Ltd.) (weight average molecular weight: 5,600 g/mol.)
d: DEMNUM S-200 (manufactured by Daikin Industries, Ltd.) (weight average molecular weight: 8,400 g/mol.)

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. An optical member comprising an optical substrate, a multilayered antireflection film provided on the optical substrate, and a water-repellent layer provided on the outermost layer of the multilayered antireflection film, wherein the outermost layer of the multilayered antireflection film is a layer containing, as a major component, silicon dioxide; and the water-repellent layer comprises a first layer containing, as major components, a fluorine-substituted alkyl group-containing organosilicon compound and a silicon-free perfluoropolyether and a second layer, provided on the first layer and which is in direct contact therewith, which consists essentially of a silicon-free perfluoropolyether.

2. The optical member according to claim 1, wherein the fluorine-substituted alkyl group-containing organosilicon compound is represented by the following general formula (I):

wherein Rf represents a linear perfluoroalkyl group having from 1 to 16 carbon atoms; X represents hydrogen or a lower alkyl group having from 1 to 5 carbon atoms; R1 represents a hydrolyzable group; m represents an integer of from 1 to 50; n represents an integer of from 0 to 2; and p represents an integer of from 1 to 10.

3. The optical member according to claim 1, wherein the fluorine-substituted alkyl group-containing organosilicon compound is represented by the following unit formula (II):

$$C_qF_{2q+1}CH_2CH_2Si(NH_2)_3 \quad (II)$$

wherein q represents an integer of 1 or more.

4. The optical member according to claim 1, wherein the silicon-free perfluoropolyether comprises a unit represented by the following general formula (III):

$$-(RO)- \quad (III)$$

wherein R represents a perfluoroalkylene group having from 1 to 3 carbon atoms.

5. The optical member according to claim 4, wherein the silicon-free perfluoropolyether has a weight-average molecule weight of from 1,000 to 10,000 g/mol.

6. The optical member according to claim 5, wherein the fluorine-substituted alkyl group-containing organosilicon compound is represented by the following general formula (I):

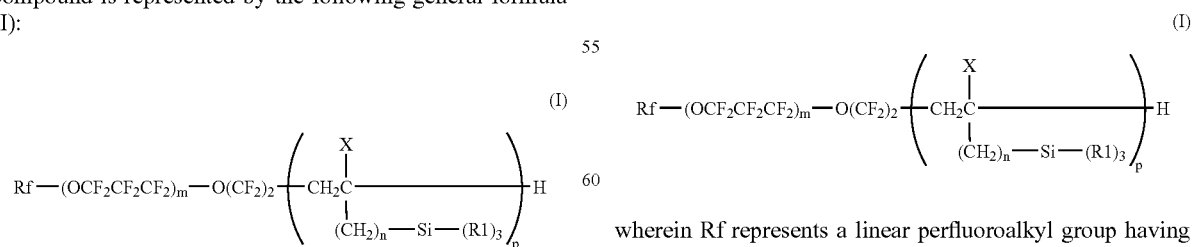

wherein Rf represents a linear perfluoroalkyl group having from 1 to 16 carbon atoms; X represents hydrogen or a lower alkyl group having from 1 to 5 carbon atoms; R1 represents a hydrolyzable group; m represents an integer of from 1 to 50; n represents an integer of from 0 to 2; and p represents an integer of from 1 to 10.

7. The optical member according to claim 5, wherein the fluorine-substituted alkyl group-containing organosilicon compound is represented by the following unit formula (II):

$$C_qF_{2q+1}CH_2CH_2Si(NH_2)_3 \quad (II)$$

wherein q represents an integer of 1 or more.

8. The optical member according to claim 1, wherein the silicon-free perfluoropolyether used for the first layer constituting the water-repellent layer and the perfluoropolyether used for the second layer are the same compound.

9. The optical member according to claim 1, wherein the first layer constituting the water-repellent layer is a layer obtainable by heating a fluorine-substituted alkyl group-containing organosilicon compound and a silicon-free perfluoropolyether diluted with a solvent in vacuo and vapor depositing them on the substrate.

10. The optical member according to claim 9, wherein the vapor deposition on the substrate is carried out under the following conditions:

Condition 1: The heating temperature of the organosilicon compound is in the range of from the evaporation initiation temperature of the organosilicon compound to the decomposition temperature of the organosilicon compound; and Condition 2: The time from the initiation of heating of the organosilicon compound to the completion of heat evaporation is within 90 seconds.

11. A process for the manufacture of an optical member comprising the step of forming a first layer on the outermost layer of a multilayered antireflection film provided on an optical substrate, wherein the outermost layer of the multilayered antireflection film is a layer containing, as a major component, silicon dioxide, from a raw material containing, as major components, a fluorine-substituted alkyl group-containing organosilicon compound and a silicon-free perfluoropolyether, followed by the step of forming a second layer on the surface of the first layer from a raw material, which consists essentially of a silicon-free perfluoropolyether.

12. Process according to claim 11, wherein the first layer is prepared by heating a fluorine-substituted alkyl group-containing organosilicon compound and a silicon-free perfluoropolyether diluted with a solvent in vacuo and vapor depositing them on the substrate.

13. Process according to claim 12, wherein the vapor deposition is carried out on the substrate under the following conditions:

Condition 1: The heating temperature of the organosilicon compound is in the range of from the evaporation initiation temperature of the organosilicon compound to the decomposition temperature of the organosilicon compound; and Condition 2: The time from the initiation of heating of the organosilicon compound to the completion of heat evaporation is within 90 seconds.

* * * * *